(No Model.) 2 Sheets—Sheet 1.
D. WALLS.
COMBINED CULTIVATOR, HARROW, AND SEEDER.
No. 371,807. Patented Oct. 18, 1887.
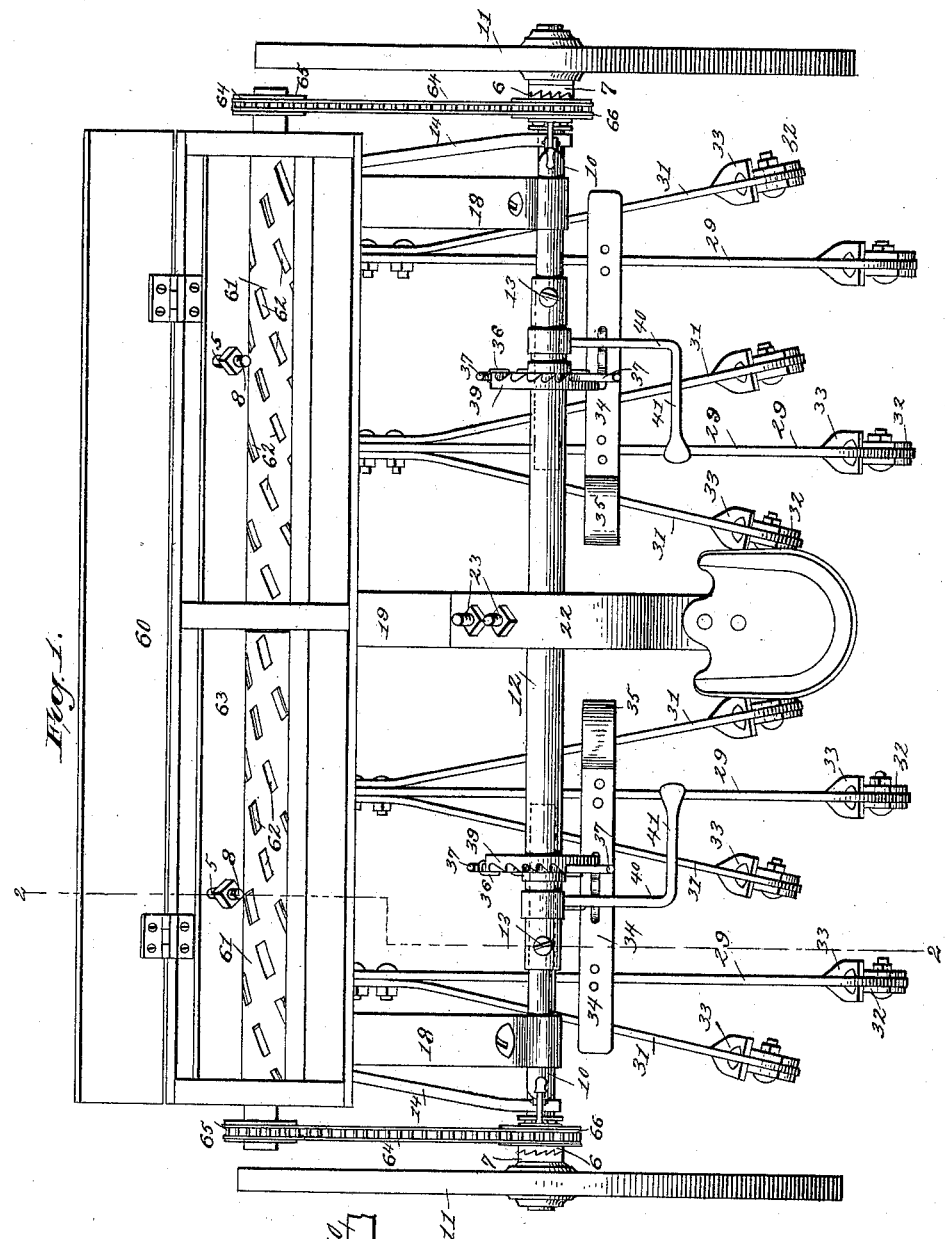
WITNESSES:
W. R. Davis
J. H. Henley
INVENTOR:
Dalton Walls
BY Munn & Co.
ATTORNEYS.

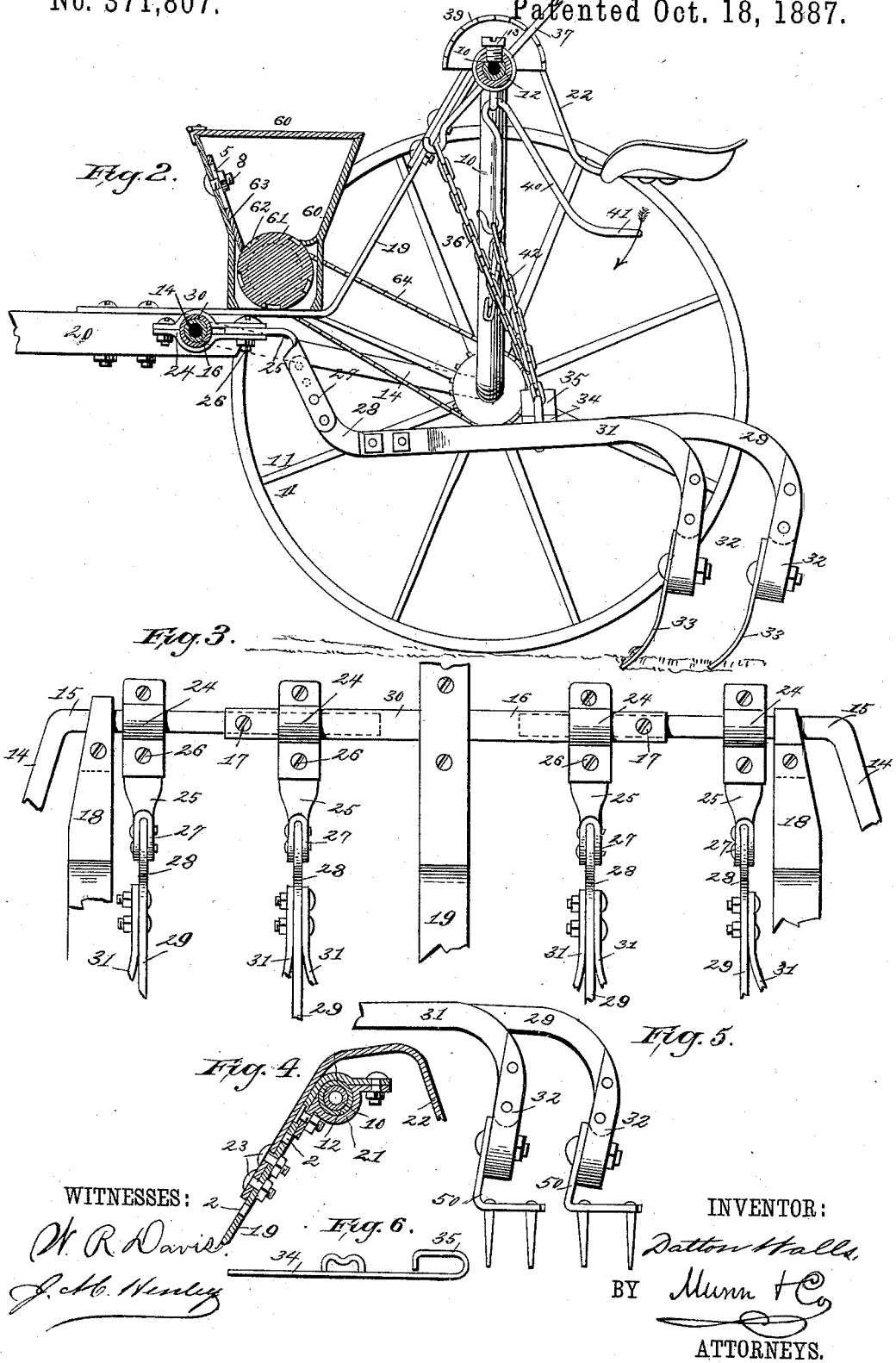

UNITED STATES PATENT OFFICE.

DALTON WALLS, OF APPLETON CITY, MISSOURI.

COMBINED CULTIVATOR, HARROW, AND SEEDER.

SPECIFICATION forming part of Letters Patent No. 371,807, dated October 18, 1887.

Application filed July 20, 1887. Serial No. 244,832. (No model.)

*To all whom it may concern:*

Be it known that I, DALTON WALLS, of Appleton City, in the county of St. Clair and State of Missouri, have invented a new and Improved Combined Cultivator, Harrow, and Seeder, of which the following is a full, clear, and exact description.

My present invention relates to an improvement upon the implement for which Letters Patent No. 331,589 were granted to me on the 1st day of December, 1885, the main objects of the present invention being to provide a seeder attachment, to provide for the lateral adjustment of the axle and forward supporting-bar, and to provide for the adjustment of the seat and for the adjustment of the shovel-beams, all as will be hereinafter more fully described, and specifically pointed out in the claims.

Reference is to be had to the accompanying drawings, forming a part of this specification, in which similar figures of reference indicate corresponding parts in all the views.

Figure 1 is a plan view of an agricultural implement constructed in accordance with the terms of my invention. Fig. 2 is a cross-sectional view taken on line 2 2 of Fig. 1. Fig. 3 is a detail view illustrating the forward bar to which the beam-clevises are connected. Fig. 4 is a sectional detail view illustrating the connection of the seat to the central brace of the frame. Fig. 5 is a detail view representing the connection between the beams and the harrow-frames. Fig. 6 is a detail view of one of the beam-connecting bars, and Fig. 7 is a detail view representing the construction of the clutch mechanism employed in connection with the seeder attachment.

In constructing the agricultural implement illustrated in the drawings above referred to, I provide a sectional axle made up of end sections, 10, upon which the wheels 11 are journaled, and these sections 10 are in the form of cranks and are placed so that their approaching ends will enter a central section, 12, which central section is made of gas-pipe, the sections 12 and 10 being connected by set-screws 13, the arrangement being such that the space between the wheels may be adjusted so that the machine will operate with any desired number of cultivator blades or shovels, the distance between the wheels necessarily being increased as the number of shovels is increased.

To the sections 10 of the axle I connect two forwardly-extending arms, 14, which are bent at 15, so that their outer ends will approach each other in the same line, and these outer ends are fitted into a central section, 16, the parts being held in any position to which they may be adjusted by set-screws 17. The approaching ends of the arms 14 and the central section, 16, form a forward bar, to which the clevises of the cultivator-shovel beams are connected; and in order that a sufficient amount of rigidity may be imparted to this forward bar, I arrange diagonal braces 18, which extend from the end sections, 10, of the axle to the approaching ends of the arms 14, while a central brace, 19, extends from the section 12 to and across the central section, 16, of the forward bar, this brace 19 being bolted to the tongue 20, as best shown in Fig. 2.

The upper end of the brace 19 is secured to the section 12 by a clip, 21, and to this upper portion of the brace 19 the seat-bar 22 is adjustably connected, a number of apertures, 2, being formed in the brace, through any proper pair of which the bolts 23 are passed, by which connection between the seat-bar and the brace is established. By the arrangement described I provide for the raising or lowering of the seat, which is bolted directly to the rearwardly-extending section of the seat-bar, as shown, probably, best in Figs. 2 and 4.

To the forward cross-bar, made up of the approaching ends of the bars 14 and the central section, 16, and which, as a whole, I will designate by the numeral 30, I connect clevises 24, which are free to turn upon their connection with the bar, and to these clevises I connect arms 25 by means of bolts 26, upon which bolts the arms are free to swing laterally.

To the downwardly-extending portions 27 of the arms 25 I bolt upwardly-extending portions 28 of one of the cultivator-beams 29 of each group of beams, the other cultivator-beams, 31, of each group being bolted to the main beam 29 and extending away from said beam at a slight angle, as illustrated, all of the beams being bent downward at their rear ends to receive standards 32, to which the cultivator-shovels 33 are bolted. The several groups of beams, arranged upon each side of the central line of the machine, are connected by bars 34, that are secured to the main beams 29, and these bars 34 are each formed or provided with stirrups 35, in which the operator may rest his feet and to a certain extent control the position of the shovels.

Chains 36 are secured to the bars 34 and brought into engagement with the lower or short arms of levers 37, that are loosely mounted upon the central section, 12, of the axle, said levers being arranged so that they may be brought into engagement with toothed racks 39, that are rigidly connected to said section 12. By moving the levers 37 so that they will engage with the proper teeth of the racks 39 the required general depth of cut of the cultivator-shovels may be obtained; but in order that the shovels may be thrown up quickly, to avoid any obstacle or to clear the shovels, I provide levers 40, which are hung beneath the section 12 and provided with treadles 41, that are within reach of the driver, and these levers 40 I connect with the bars 34 by means of chains 42, the arrangement being such that by throwing either of the levers downward in the direction of the arrow shown in connection with the lever 40, that is illustrated in Fig. 2, the beams upon that side of the machine may be thrown upward. When desired, the cultivator-shovels may be removed and V-shaped harrow-frames 50 may be substituted therefor, the harrow-frames being preferably formed so that the teeth may be set either in a vertical position, as illustrated in Fig. 5, or so that they will incline to the rear.

A seed-box, 60, is mounted in advance of the axle, and in the lower portion of this seed box or hopper I mount feeding-rollers 61, which rollers are preferably made of cast-iron, indentations or recesses 62 being arranged in lines which extend spirally across the peripheral faces of the rollers. Regulating-slides 63 are adjustably connected to the forward wall of the seed-box, being held thereto by bolts 8, which pass through said wall and through slots 5, that are formed in the slides, the arrangement being such that the quantity of seed delivered may be varied by adjusting the slides toward or from the rollers.

The rollers 61 are driven in any manner desired, but preferably by means of drive-chains 64, which run in connection with sprocket-wheels 65, carried by the rollers, and with other sprocket-wheels, 66, that are loosely mounted upon the axle sections 10, the sprocket-wheels 66 being provided with clutch-sections 6, which may be thrown into engagement with other clutch-sections, 7, that are formed upon the wheel-hubs, as shown clearly in Fig. 7.

By arranging the recesses 62 so that they extend in spiral lines across the peripheral faces of the rollers 61, I arrange for a gradual and even distribution of the seed.

The axle-sections 10 may be made in any manner desired; but in practice I prefer to form said sections of gas-pipe, having found that said material possesses sufficient strength to resist the strain necessarily brought to bear upon the axle.

It will be noticed that there are two sets of apertures formed in the downwardly-extending portions 27 of the arms 25, these two sets being provided in order that as the shovels 23 become worn the forward ends of the beams may be lowered and practically the same general angle may be maintained.

Having thus fully described my invention, I claim as new and desire to secure by Letters Patent—

1. The combination, with an axle made up of sections 10 and 12, that are united by setscrews, of a forward bar, 30, made up of arms 14 and a section, 16, that are united by a setscrew, 17, clevises loosely mounted upon the bar 30, beams connected to the clevises, and operating-levers connected to the beams, substantially as described.

2. In an agricultural implement, the combination, with an adjustable crank-axle, of an adjustable forward bar rigidly connected to the axle, clevises connected to the forward bar, beams connected to the clevises and arranged in groups, bars connecting the groups upon each side of the machine, adjustable levers connected to the bars, and treadle-levers also connected to the bars, substantially as described, and for the purpose stated.

3. In an agricultural implement, the combination, with a main frame, substantially as described, of clevises connected to said frame and free to swing thereon, arms pivotally connected to the clevises, beams adjustably connected to the arms, and operating-levers connected to the beams, substantially as described.

4. The combination, with the axle-section 12, the brace 19, provided with apertures 2, and the clip 21, of the seat-support 22 and the bolts 23, substantially as set forth.

DALTON WALLS.

Witnesses:
 FRED ADAMS,
 J. M. PRICE.